United States Patent
Watanabe et al.

[11] Patent Number: 5,520,062
[45] Date of Patent: May 28, 1996

[54] WINDOW MECHANISM FOR SENSOR IN INDUSTRIAL ROBOT

[75] Inventors: Atsushi Watanabe; Ryo Nihei; Akihiro Terada; Takahiro Hase, all of Yamanashi, Japan

[73] Assignee: Fanuc Ltd., Yamanashi, Japan

[21] Appl. No.: 412,123

[22] Filed: Mar. 28, 1995

[30] Foreign Application Priority Data

Mar. 29, 1994 [JP] Japan .................................. 6-059136

[51] Int. Cl.[6] .............................................. G01M 19/00
[52] U.S. Cl. ................. 73/866.5; 15/250.29; 356/448; 901/41; 901/42; 901/47
[58] Field of Search ................... 73/866.5; 15/250.29; 901/41, 42, 43, 44, 46, 47, 49; 356/448

[56] References Cited

U.S. PATENT DOCUMENTS

| | | | |
|---|---|---|---|
| 4,311,556 | 1/1982 | Iwamoto et al. | 901/44 X |
| 4,486,098 | 12/1984 | Buchegger et al. | 356/448 X |
| 4,576,482 | 3/1986 | Pryor | 356/376 |
| 4,605,569 | 8/1986 | Shimada et al. | 901/41 X |
| 4,826,316 | 5/1989 | Odum | 356/239 |
| 4,880,265 | 11/1989 | Drexel et al. | 901/41 X |
| 5,044,064 | 9/1991 | Muselli | 901/41 X |
| 5,337,148 | 8/1994 | Torii et al. | 356/376 |

Primary Examiner—Thomas P. Noland
Attorney, Agent, or Firm—Nikaido, Marmelstein, Murray & Oram

[57] ABSTRACT

A window mechanism for a sensor provided at the distal end of a robot arm of an industrial robot comprises a housing for enclosing the sensor which housing includes an opening, a glass plate for closing the opening, wiper for wiping the outer surface of the glass plate, a holder plate for slidably holding the glass plate member on the housing, and an exchanger for exchanging the plate member held by the holder with a new glass plate.

14 Claims, 7 Drawing Sheets

5,520,062

WINDOW MECHANISM FOR SENSOR IN INDUSTRIAL ROBOT

BACKGROUND OF THE INVENTION

1. Field of the Invention

The invention relates to a window mechanism for a sensor in an industrial robot.

2. Description of the Related Art

Various automatic machining processes are realized by an industrial robot with an end effector such as a welding device or a laser beam machining device mounted onto the distal end of a robot arm. In order to optimize the machining process, a sensor is provided for detecting a locational or dimensional error of the workpiece. The process is carried out after correcting the error. In general, the sensor is disposed inside or outside the end effector at the distal end of the robot arm.

When the end effector is a welding device or laser beam machining device, a sensor of the non-contact type, such as an infrared sensor or a laser sensor, is suitable. The welding process and the laser beam machining process generate high temperature gas, fumes and spatters. In order to protect the sensor from the high temperature gas, fumes and spatters, the sensor is enclosed in the housing of the end effector or in a separate housing for the sensor. The housing, in which the sensor is provided, has a window through which the infrared beam or the laser beam is projected and the reflection thereof is received. The window includes a slot or an opening which is covered by a closing member such as a glass plate.

The outer surface of the closing member becomes contaminated by the spatters and fumes from the machining region. When the contamination on the outer surface of the closing member is extensive, the sensor cannot function. In order to prevent this, it is necessary to remove the spatters or fumes on the outer surface of the closing member or to exchange the closing member at intervals. In the prior art, these operations were carried out by an operator, which results in increasing the time and cost for the machining process.

SUMMARY OF THE INVENTION

The invention is directed to solve the problems of the prior art and to provide a window mechanism for a sensor in an industrial robot which can remove the spatters or fumes on the outer surface of the closing member or exchange the contaminated closing member for a new closing member automatically.

There is provided a window mechanism for a sensor provided at the distal end of a robot arm of an industrial robot having an end effector for machining a workpiece, the sensor having a projecting means for projecting detection waves toward the workpiece and a transducing means for receiving reflected waves from the workpiece and for generating an electrical signal according to the received wave. The window mechanism comprises means for enclosing the sensor, the enclosing means having a housing which includes an opening through which the detection waves are projected by the projecting means and the reflected waves are received by the transducing means, means for closing the opening which comprises a plate member provided on the housing and being transparent to the detection waves and the reflected waves, and means for wiping the outer surface of the plate member to remove the contaminating substances generated during the machining process and attached to the outer surface of the plate member.

The wiping means preferably comprises a wiper member provided so as to engage with the outer surface of the plate member, and means for actuating the wiper member such that the wiper member reciprocates across the outer surface of the plate member.

In the preferred embodiment of the invention, the plate member comprises a glass plate, the wiper member being made of a fluorocarbon rubber material, and the actuating means comprising at least a double acting air cylinder mounted on the housing to reciprocate the wiper means.

In one embodiment of the invention, the window mechanism further comprises means for slidably holding the plate member on the housing, and means for exchanging the plate member on the housing with a new closing member.

In another embodiment of the invention, the window mechanism comprises means for enclosing the sensor, the enclosing means having a housing which includes an opening through which the detection waves are projected by the projecting means and the reflected waves are received by the transducing means, means for closing the opening which comprises a plate member provided on the housing and being transparent to the detection waves and the reflected waves, means for slidably holding the plate member on the housing, and means for exchanging the plate member on the housing with a new plate member.

The exchanging means preferably comprises a housing within which a plurality of new plate members are piled and means for moving one of the plurality of new plate members piled within the housing in the horizontal direction in such a manner that the end of the moved plate member abuts that of the plate member held by the holding means and can emerge from the housing by sliding in the horizontal direction. The means for moving the one of plurality of plate members piled within the housing comprises a pusher member slidably provided to abut and press the one of the plurality of piled plate members, means for guiding the pusher member in the horizontal direction, and means for driving the pusher member when the housing for the sensor is disposed at the exchanging position.

Preferably, the window mechanism further comprises means for controlling the movement of the robot arm to move the housing to the exchanging position where the closing member on the housing can be exchanged with the new plate member.

DESCRIPTION OF THE PREFERRED EMBODIMENTS

Figure 2:
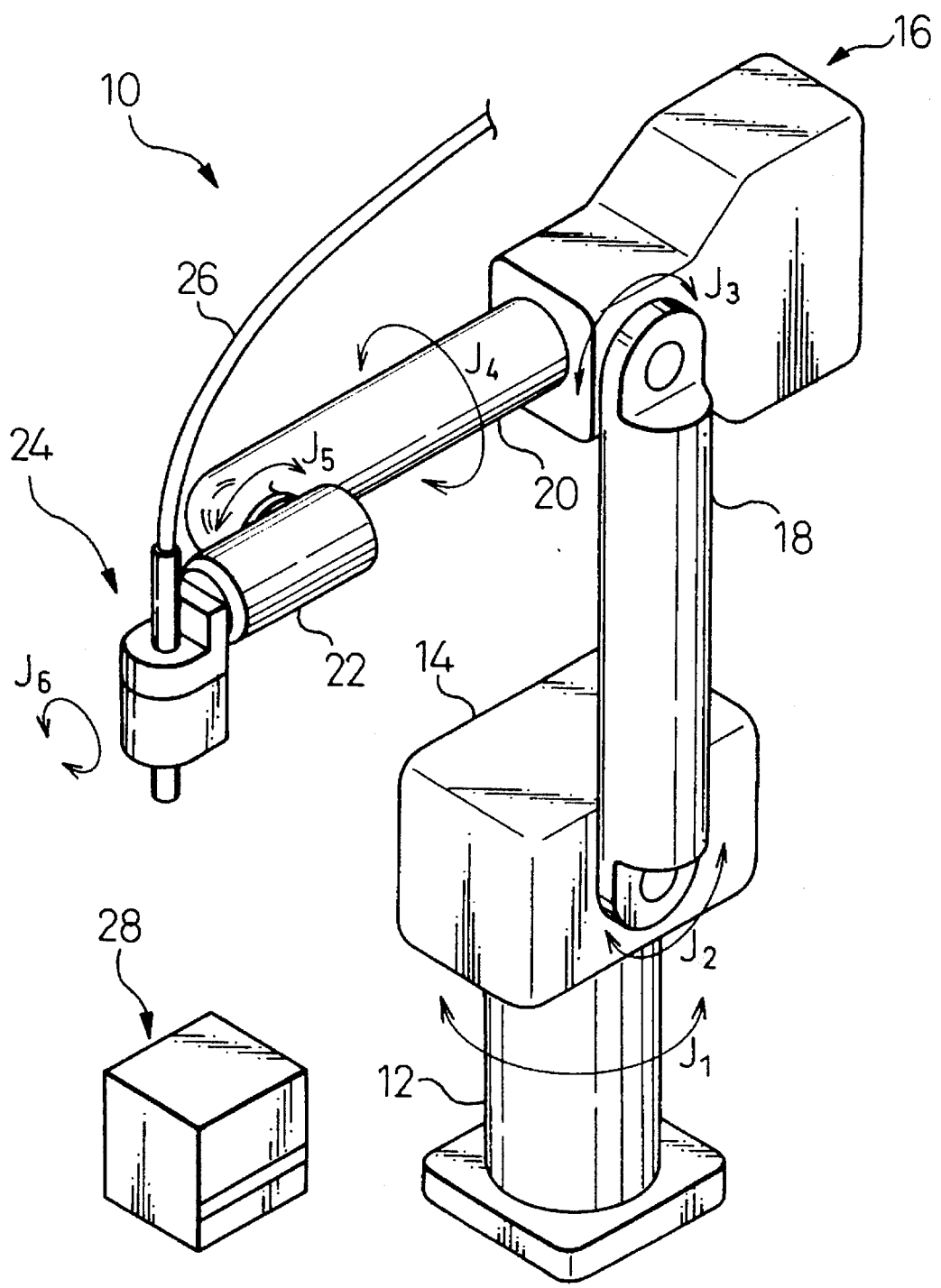
FIG. 2 is a perspective illustration of the welding robot system with the window mechanism of the invention.

In FIG. 2, there is shown an industrial robot 10 with a welding device 24 mounted to the distal end of a robot arm 16. The industrial robot 10 has a fixed base 12 and a rotating base 14 mounted to the fixed base 12 for rotation about a vertical rotational axis J1. The robot arm 16 is mounted to the rotating base 14 for rotation about a horizontal rotational axis J2.

The robot arm 16 includes a first robot arm 18 and a second robot arm 20. The first robot arm 18 is mounted to the rotating base 14 at an end thereof. The second robot arm 20 is mounted to the other end of the first robot arm 18 for rotation about a rotational axis J3 parallel to the rotational axis J2. The second robot arm 20 can also rotate about a longitudinal axis J4 perpendicular to the rotational axis J3.

A robot wrist 22 is mounted to the distal end of the second robot arm 20 for rotation about a rotational axis J5 perpendicular to the rotational axis J4. The welding device 24 is mounted to the end of the robot wrist 22 about a rotational axis J6. Thus, the industrial robot 10 is a vertical articulated robot with six rotational axes.

Although the welding device 24 in this embodiment is a gas shielded arc welding device as an example, it may be a plasma welding device or a laser beam welding device. The welding device 24 is controlled by a robot controller 72 (FIG. 8) and has a integrated cable 26 for supplying gas, electric power and welding wire which are necessary to the welding process.

Figure 3:
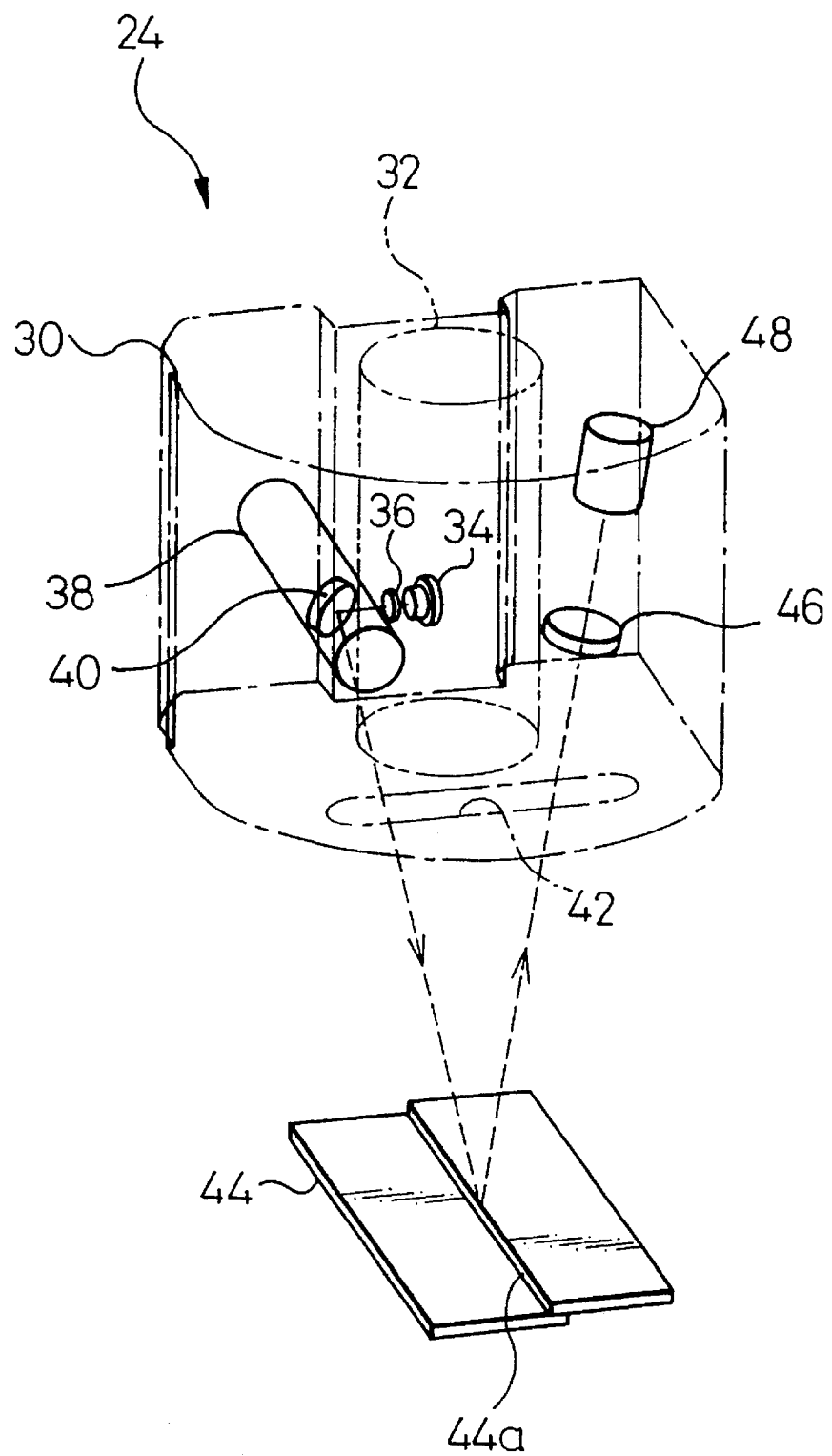
FIG. 3 is a perspective illustration of a sensor provided within a housing of a welding device, to which housing the window mechanism can be applied.

With reference to FIG. 3, the sensor provided in the welding device 24 will be described.

Figure 4:
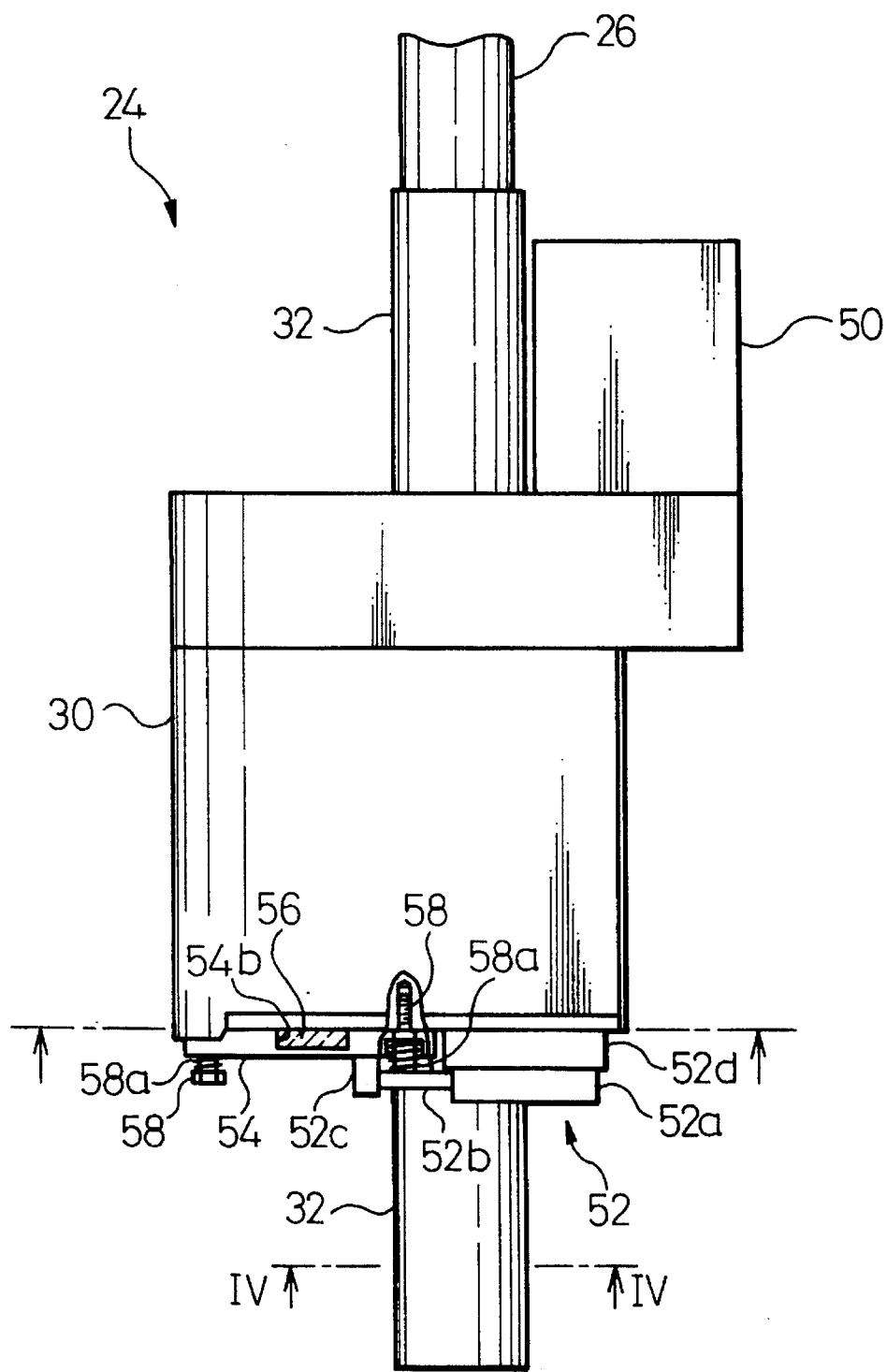
FIG. 4 is a side elevation of the welding device with the window mechanism of the invention.
Figure 5:
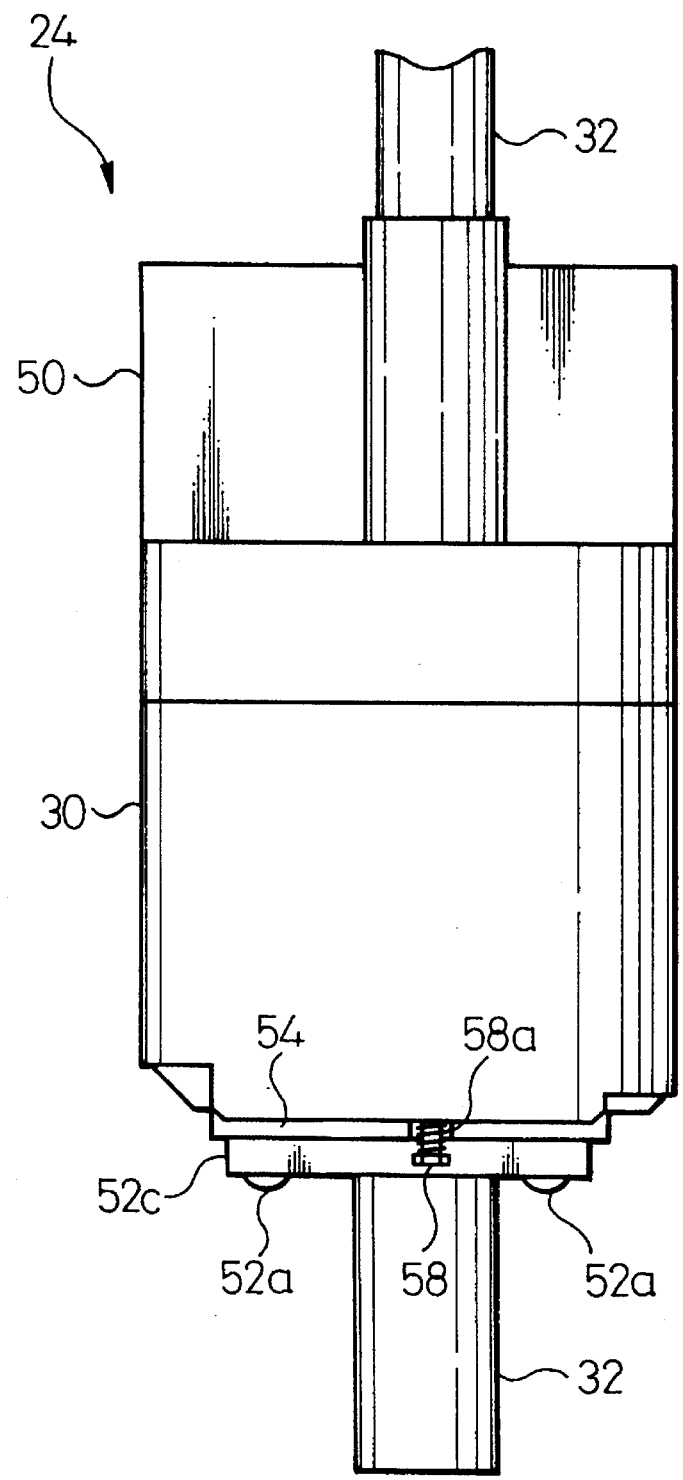
FIG. 5 is a front elevation of the welding device with the window mechanism of the invention.
Figure 6:
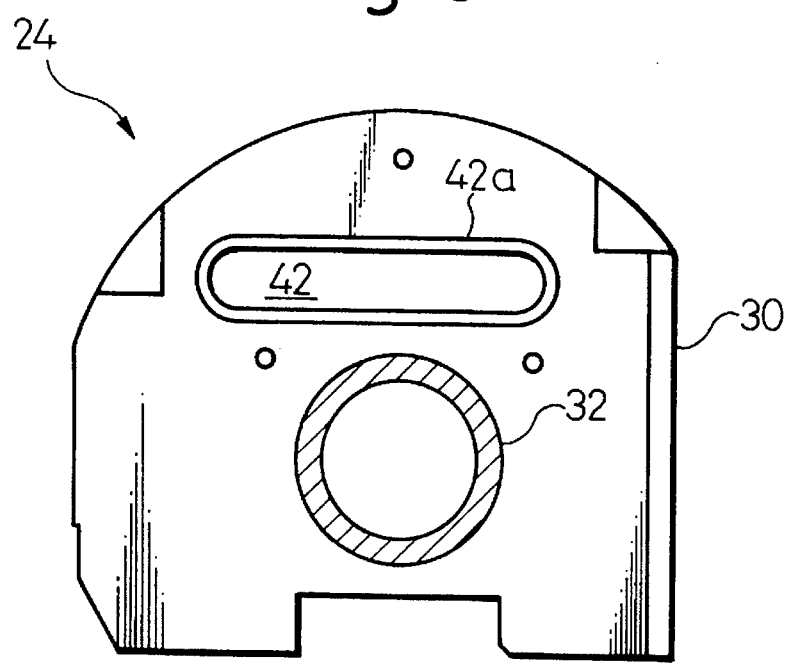
FIG. 6 is a lower end face of the housing illustrated in FIGS. 3–5.
Figure 7:
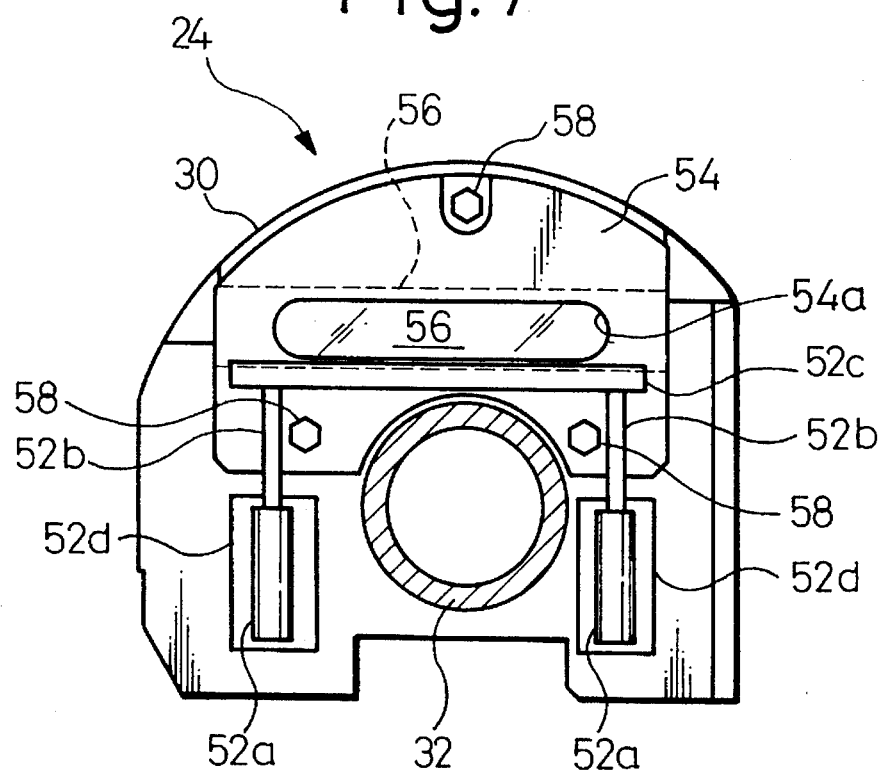
FIG. 7 is a lower end face of the housing illustrated in FIG. 6 with a holder plate of the window mechanism of the invention.

The sensor is provided within a housing 30 of the welding device 24 and comprises an optical sensor using a laser beam. The welding device 24 has a torch 32 passing through the housing 30 which includes an elongated slot or an opening 42 in the lower end face thereof. The slot 42 is closed by a closing member 56 (FIG. 4). In this embodiment, the closing member 56 comprises a heat resisting glass plate.

The optical sensor comprises a laser diode 34 as a source of a laser beam. A lens 36 makes the laser beam from the laser diode 34 a parallel beam when it passes through lens 36. The parallel laser beam reaches the surface of a workpiece 44 through the slot 42 after the beam is reflected by a mirror 40 of a scanner 38. When the scanner 38 rotates, the reflected laser beam scans the surface of the workpiece 44. The laser beam reflected on the surface of the workpiece 44 passes through a lens 46 and is received by a transducer which comprises a CCD 48 which generates an electric signal according to the magnitude of the reflected beam from the surface of the workpiece 44. The change of the electric signal from the CCD 48 shows the position of the weld line 44a.

With reference to FIGS. 4–7, the window mechanism with a wiper of this embodiment is described.

The housing 30 is mounted to the robot wrist 22 by a bracket 50. The torch 32 is passes through the housing 30 and the integrated cable 26 is attached to the rear end of the torch 32. The housing 30 includes the slot 42, which is enclosed by the glass plate 56, in the lower end face. The glass plate 56 is held by a holder plate 54. The holder plate 54 includes a slot 54a which coincides with the slot 42 when the holder plate 54 is mounted. The laser beam from the laser diode 34 passes through the slot 42 of the housing 30, the glass plate 56 and the slot 54a of the holder plate 54.

The holder plate 54 is detachably mounted to the lower end face of the housing 30 by three bolts 58. Springs 58a provided between the holder plate 54 and the heads of the bolts 58 press the holder plate 54 against the lower end face of the housing 30. The pressure form the holder plate 54 onto the glass plate 56 is adjusted by rotating the bolts 58.

The holder plate 54 includes a channel 54b which has a width substantially the same as that of the glass plate 56. The channel 54b passes through the holder plate 54 from one side of the holder plate 54 to the other in the direction parallel to the longitudinal axis of the slot 54a. The glass plate 56 is slidably held within the channel 54b.

A packing 42a provided between the lower end face of the housing 30 and the holder plate 54 so as to surround the slot 42. The packing 42a is attached to the lower end face of the housing 30 by a suitable adhesive agent. In the drawings, the detail arrangement is not shown, however, the housing includes a groove for the packing 42a which makes the packing 42a substantially flush with the lower end face of the housing 30.

A wiper device is provided at the lower end face of the housing 30 for removing the spatters and fumes generated during the welding process and attached to the outer surface of the glass plate 56. The wiper device comprises a pair of double acting air cylinders 52a secured to the lower end face of the housing 30 by a bracket 52d and a wiper 52c secured to the distal ends of the piston rods 52b of the pair of air cylinders 52a. The air cylinders 52a are oriented perpendicular to the longitudinal axis of the slot 54a such that the wiper 52c can engage the glass plate 56 when the piston rods 52b are advanced. The wiper 52c is made of a flexible material, preferably a fluorocarbon rubber material or a fluorocarbon rubber material with a heat insulating material, such as asbestos, on the surface thereof.

The holder plate 54 and the glass plate 56 are not flush with each other. The flexibility of the wiper material allows the wiper 52c to engage the outer surface of the glass plate 56 in spite of a difference between the outer surfaces of the holder plate 54 and the glass plate 56. In order to improve the engagement between the wiper 52c and the outer surface of the glass plate 56, the wiper 52c can have a slightly reduced length compared with that of the slot 54a. Further, the wiper 52c may be biased by a spring (not shown) to obtain a close engagement.

Compressed air from an air source, such as an air compressor 78 actuates the pair of air cylinders 52a. The operation of the pair of air cylinders 52a is controlled by the robot controller 72 (FIG. 8) to be synchronized, that is, the piston rods 52b of the pair of air cylinders 52a are advanced and retracted at the same time, which results in the wiper 52c moving across the outer surface of the glass plate 56 while engaged with the surface. When the wiper 52c moves across the outer surface of the glass plate 56, the spatters and fumes on the outer surface are removed.

Figure 8:
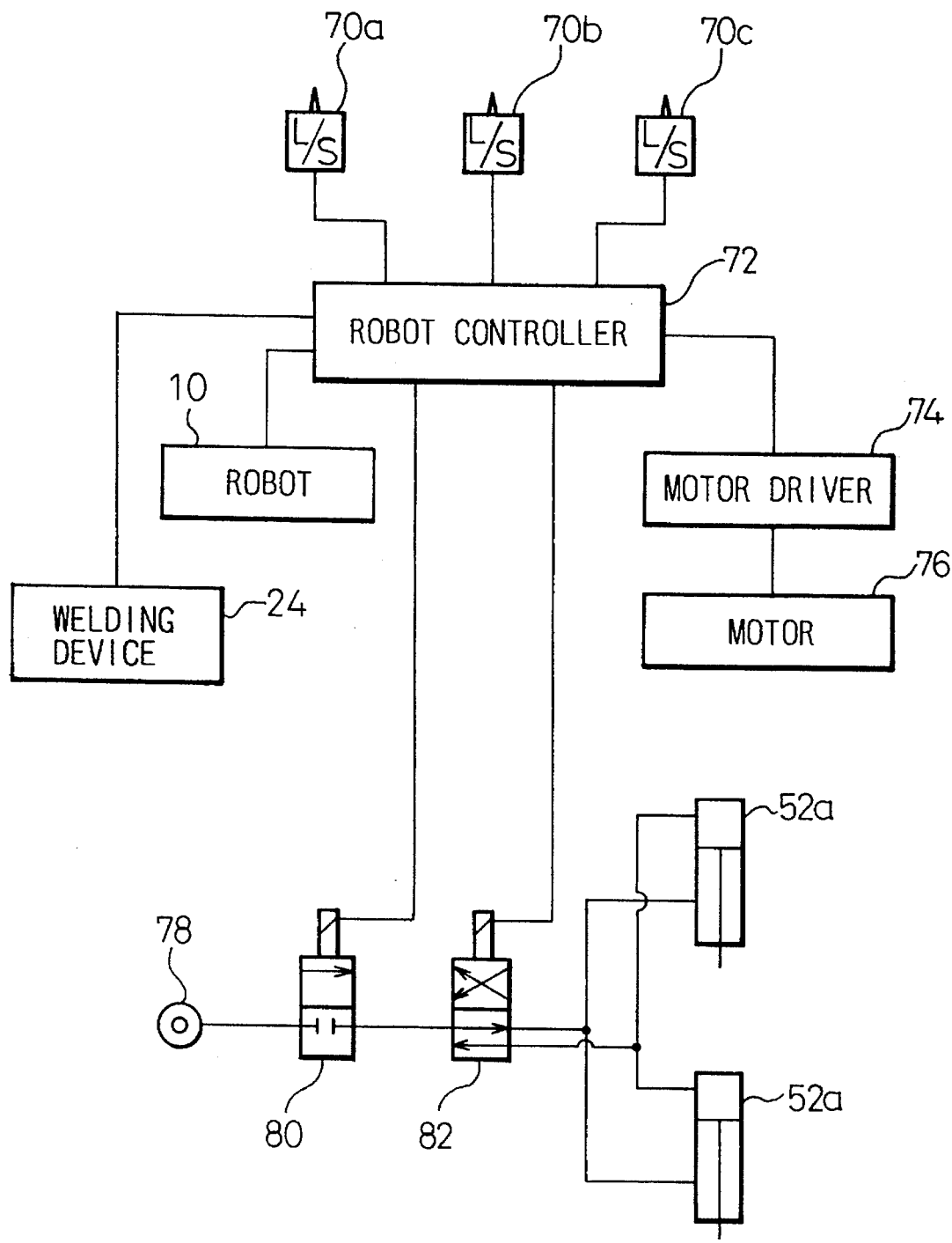
FIG. 8 illustrates a block diagram of the control system of the window mechanism of the invention.

Referring to FIG. 8, which illustrates a block diagram of a control system of the window mechanism, the compressed air from the air source 78 is supplied to the pair of air cylinders 52a through a solenoid operated shut off valve 80 and a solenoid operated directional control valve 82. The solenoids of the shut off valve 80 and the directional control valve 82 are electrically connected to the robot controller 72. When a cycle of the welding process is completed and the sequential cycle is not started, the solenoid of the shut off valve 80 is activated, which results in the fluid communication between the air source 78 and the pair of air cylinders 52a. By repeating the activation and deactivation of the solenoid of the directional control valve 82, the piston rods of the air cylinders 52a repeat their advance and retraction with their operation being synchronized.

Figure 1:
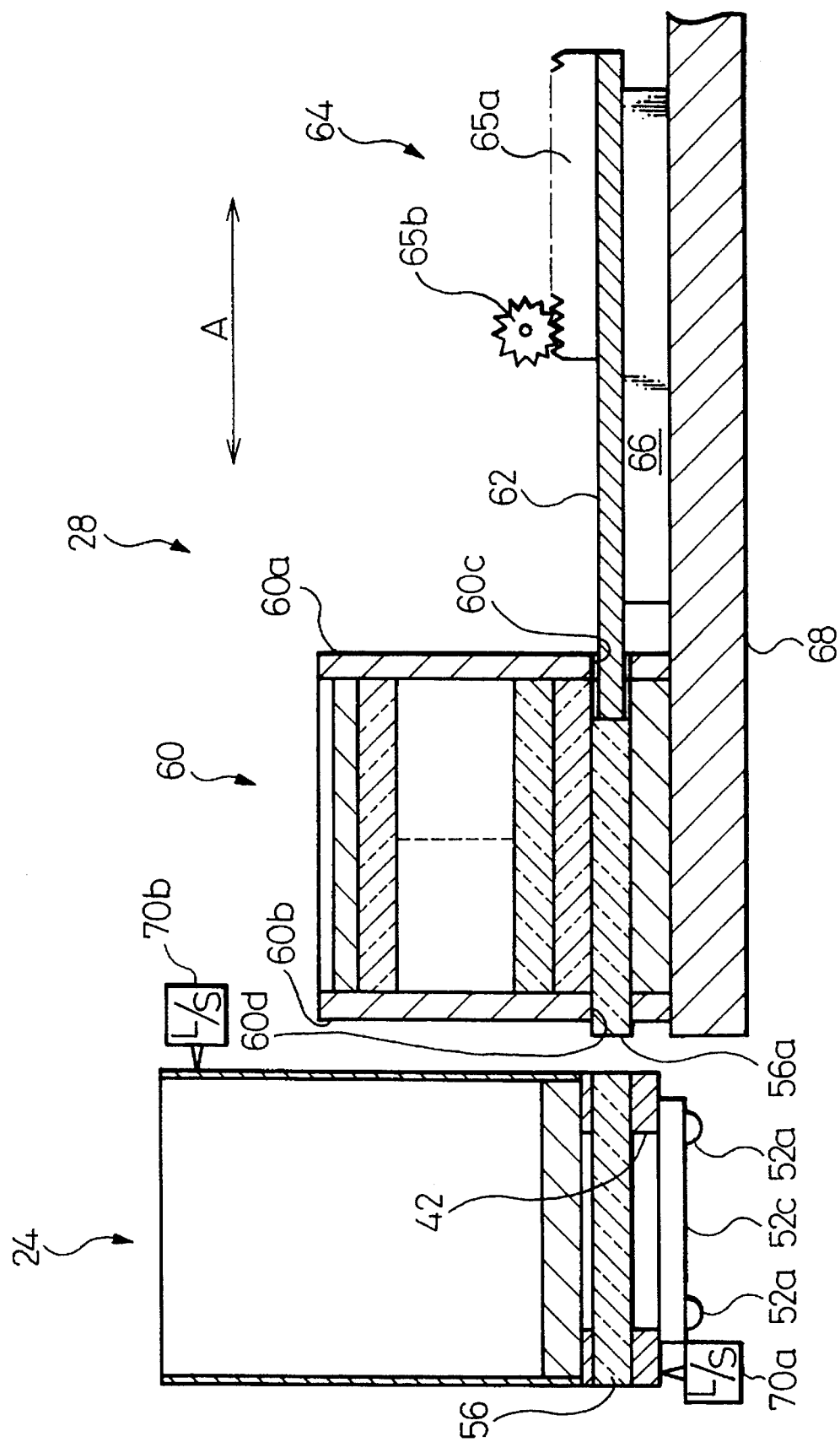
FIG. 1 is a side section of the window mechanism according to the preferred embodiment of the invention.

With reference to FIG. 1, a device 28 for exchanging the glass plate 56 closing the slot 42 of the housing 30 will be described.

As shown in FIG. 1, the exchanging device 28 is separately provided near the industrial robot 10. Although the exchanging device 28 is not mounted to the robot arm 16, it is controlled by a robot controller 72 (FIG. 8) which controls the movement of the industrial robot 10. As described above, the welding device 24 and the wiper device are controlled by the robot controller 72. Thus, the industrial robot 10, the welding device 24, the wiper device and the exchanging device 28 form a welding system.

The device 28 comprises a rectangular parallelopiped housing 60 which holds a plurality of new glass plates and is secured to the upper face of horizontal base 68 and a device 64 for moving a new glass plate 56a in the horizontal direction. The moving device 64 comprises a pusher member 62 which is provided so as to abut the lowest one of the new glass plates piled within the housing 60, a guide means 66 for the pusher member 62 and a driving means 65 for the pusher member 62. The pusher member 62 can comprise a pusher rod(s) or a pusher plate. The guide means 66 can comprises a guide rail, a dovetail groove or a liner guide. The driving means 65 comprises a rack gear 65a secured to the pusher member 62, a pinion gear 65b engaging the rack gear 65a and secured to a driving motor 76 (FIG. 8) for rotating the pinion gear 65b. According to the rotational direction of the driving motor 76, the pusher member 62 is advanced or retracted as indicated by A in FIG. 1.

The housing 60 has horizontal slots 60c and 60d at the lower part of the side walls 60a and 60 facing to each other. The slot 60d has a dimension which allows the lowest one 56a of the new glass plates piled within the housing 60 to pass through the slot 60d. The slot 60c has a dimension which allows the pusher member 62 of the moving device 64 to pass through the slot 60c.

In this embodiment, the exchanging device 28, further, comprises three limit switches 70a, 70b and 70c, two of which, 70a and 70b, are shown in FIG. 1 and the other, 70c, is shown in FIG. 8. In order to dispose the housing 30 at a closing member exchange position, where the glass plate 56 on the housing 30 is aligned with a new glass plate 56a for exchanging the glass plate 56 with the new glass plate 56a, the limit switches 70a, 70b and 70c are provided to limit the movement of the robot arm 16 so that the housing 30 is disposed at the exchange position. Referring to FIG. 8, the limit switches 70a, 70b and 70c are electrically connected to the robot controller 72. When one of the limit switches 70a, 70b and 70c contacts the housing 30, the movement of the robot arm 16, in the direction corresponding to the contacted switch, stops.

When the housing 30 of the welding device 24 is disposed at the exchange position as shown in FIG. 1, the robot controller 72 activates the driving motor 78 through the motor driver 74. The driving motor 76 rotates the pinion gear 65b which results in the movement of the pusher member 62 by the rack gear 65a. When the pusher member 62 abuts the end of the new glass plate 56a, the pusher member 62 pushes the new glass plate 56a from the housing 60 in the horizontal direction. The new glass plate 56a pushed by the pusher member 62 abuts the side of the glass plate 56 on the housing 30 through the groove 54a of the holder plate 56. When the pusher member 62 pushes further, the glass plate 56a pushes the glass plate 56 from the groove 54a in the horizontal direction, thus the glass plate 56 closing the slot 42 of the housing 30 is exchanged with the new glass plate 56a.

The exchanging the glass plate 56 on the housing 30 with a new glass plate 56a at intervals prevents the sensor in the housing 30 from losing its detection ability. The glass plates 56 can be exchanged by using a sensor (not shown) provided within the housing 30 for detecting the contamination on the outer surface of the glass plate 56. The exchanging device 28 can be operated alone or together with the wiper device.

Although the preferred embodiments of the invention are described, it will be understood by those skilled in the art that the invention is not limited by the above described embodiments and can be improved and varied within the scope and the spirits of the invention.

For example, the sensor for detecting the welding line can be an infrared sensor instead of the laser sensor.

The closing member can be comprise a plate, which is transparent to the beam from the sensor, instead of a glass plate.

The slot or the opening in the housing of the welding device may be a circular, elliptical, square or combination shape. Furthermore, the housing can include a slot or an opening on the side wall. When the slot is provided on the side wall, the exchanging device may operate vertically.

The robot arm can be stopped by an absolute coordinate system of the robot controller instead of the limited switches.

The wiper can be actuated by rack and pinion gears instead of the air cylinder. The wiper may include a cover which protects the wiper from the spatters and fumes.

The driving means for the pusher member can comprise an air cylinder or a feed thread with a motor instead of the rack and pinion gears.

What is claimed is:

1. A window mechanism for a sensor provided at the distal end of a robot arm of an industrial robot having an end effector for machining a workpiece, said sensor having a projecting means for projecting detection waves toward said workpiece and a transducing means for receiving reflected waves from said workpiece and for generating an electrical signal according to said received wave, in which said window mechanism comprises;

means for enclosing said sensor, said enclosing means having a housing which includes an opening through which said detection waves are projected by said projecting means and said reflected waves are received by said transducing means;

means for closing said opening which comprises a plate member provided on said housing and being transparent to said detection waves and said reflected waves; and means for wiping the outer surface of said plate member to remove contamination substances generated during a machining process and attached to said outer surface of said plate member.

2. A window mechanism according to claim 1, in which said wiping means comprises, a wiper member provided so as to engage the outer surface of said plate member; and means for actuating said wiper member such that said wiper member reciprocates across the outer surface of said plate member.

3. A window mechanism according to claim 2, in which said plate member comprises a glass plate;

said wiper member being made of a fluorocarbon rubber material; and said actuating means comprising at least a double acting air cylinder mounted to said housing to reciprocate said wiper means.

4. A window mechanism according to claim 3, in which said window mechanism further comprises;

means for slidably holding said plate member on said housing; and means for exchanging said plate member on said housing with a new closing member.

5. A window mechanism according to claim 4, in which said exchanging means comprises a housing within which a plurality of new plate members are piled, and means for moving one of said plurality of new plate 10 members piled within said housing in the horizontal direction in such a manner that the end of said moved plate member abuts that of said plate member held by said holding means and can emerge from the housing by sliding in the horizontal direction; and said window mechanism further comprising means for controlling the movement of said robot arm to move said housing to an exchanging position where said closing member on said housing is exchanged with said new plate member.

6. A window mechanism according to claim 5, in which said means for moving said one of a plurality of plate members piled within said housing comprises a pusher member slidably provided to abut and press said one of said plurality of piled plate members;

means for guiding said pusher member in the horizontal direction; and means for driving said pusher member when said housing for said sensor is disposed at said exchanging position.

7. A window mechanism for a sensor provided at the distal end of a robot arm of an industrial robot having an end effector for machining a workpiece, said sensor having a projecting means for projecting detection waves toward said workpiece and a transducing means for receiving reflected waves from said workpiece and for generating an electrical signal according to said received wave, said window mechanism comprising;

means for enclosing said sensor, said enclosing means having a housing which includes an opening through which said detection waves are projected by said projecting means and said reflected waves are received by said transducing means;

means for closing said opening which comprises a plate member provided on said housing and is transparent to said detection waves and said reflected waves;

means for slidably holding said plate member on said housing; and means for exchanging said plate member on said housing with a new plate member.

8. A window mechanism according to claim 7, in which said exchanging means comprises a housing within which a plurality of new plate members are piled, and means for moving one of said plurality of new plate members piled within said housing in the horizontal direction in such a manner that the end of said moved plate member abuts that of said plate member held by said holding means and can emerge from the housing by sliding in the horizontal direction; and said window mechanism further comprising means for controlling the movement of said robot arm to move said housing to an exchanging position where said closing member on said housing can be exchanged with said new plate member.

9. A window mechanism according to claim 8, in which said means for moving said one of plurality of plate members piled within said housing comprises a pusher member slidably provided to abut and press said one of said plurality of piled plate members;

means for guiding said pusher member in the horizontal direction; and means for driving said pusher member when said housing for said sensor is disposed at said exchanging position.

10. A window mechanism according to claim 9, in which said plate member comprises a glass plate.

11. A window mechanism according to claim 10, in which said window mechanism further comprises means for wiping the outer surface of said plate member on said housing to remove any contaminating substance generated during said machining process and attached to said outer surface of said plate member.

12. A window mechanism according to claim 11, in which said wiping means comprises;

a wiper member provided so as to engage the outer surface of said plate member;

a means for actuating said wiper member such that said wiper member reciprocates across the outer surface of said plate member; and means for controlling the operation of said actuating means.

13. A window mechanism according to claim 12, in which said wiper member is made of a fluorocarbon rubber material; and said actuating means comprising at least a double action air cylinder mounted to said housing to reciprocate said wiper means.

14. A window mechanism according to claim 13, in which said window mechanism further comprises;

means for slidably holding said plate member on said housing; and means for exchanging said plate member on said housing with a new closing member.

* * * * *